(12) United States Patent
Fichtl et al.

(10) Patent No.: US 8,349,383 B2
(45) Date of Patent: Jan. 8, 2013

(54) PROCESS FOR PRODUCING STORAGE-STABLE SEED CRYSTALS OF COCOA BUTTER AND/OR OF CHOCOLATE MASSES

(75) Inventors: Peter Fichtl, Ebstorf (DE); Holger Dietrich, Krefeld (DE); Ralf Schliehe-Dierks, Munster (DE)

(73) Assignee: Uelzena eG, Uelzen (DE)

( * ) Notice: Subject to any disclaimer, the term of this patent is extended or adjusted under 35 U.S.C. 154(b) by 246 days.

(21) Appl. No.: 12/908,970

(22) Filed: Oct. 21, 2010

(65) Prior Publication Data
US 2011/0159159 A1    Jun. 30, 2011

(30) Foreign Application Priority Data
Oct. 23, 2009 (EP) .................................... 09013408

(51) Int. Cl.
*C11B 15/00* (2006.01)
(52) U.S. Cl. .................. 426/495; 426/631; 426/417
(58) Field of Classification Search .................. 426/631, 426/417, 478, 495
See application file for complete search history.

(56) References Cited

U.S. PATENT DOCUMENTS

| | | |
|---|---|---|
| 2005/0049426 A1 | 3/2005 | Windhab et al. |
| 2005/0082701 A1 | 4/2005 | Shekunov et al. |
| 2006/0141110 A1* | 6/2006 | Fages et al. ................ 426/285 |

FOREIGN PATENT DOCUMENTS

| | | |
|---|---|---|
| DE | 19748069 A1 | 5/1999 |
| DE | 60313210 T2 | 6/2004 |
| EP | A 0521205 A1 | 1/1993 |
| WO | WO 95/21688 | 8/1995 |
| WO | WO 98/30108 | 7/1998 |
| WO | WO 2009/005346 | 1/2009 |

OTHER PUBLICATIONS

Kokot, K.et al. 1999. Acta Alimentaria 28(2)197.*
Braun et al., "Selective precrystallization: a revolutionary process", Prof.Journal for All Areas of the Confectionary Industry, Bd.55, No. 1, Jan. 1, 2002, pp. 1430-2446.

* cited by examiner

*Primary Examiner* — Carolyn Paden
(74) *Attorney, Agent, or Firm* — Nash and Titus, LLC

(57) ABSTRACT

The invention relates to a process for the production of seed crystals for chocolate products, which process comprises the following steps: Melting cocoa butter or chocolate masses, mixing the melted mass with a supercritical fluid, expanding the obtained solution in an expansion apparatus so that the formation of powder particles takes place, and separation of the powder particles from the gas. The seed crystals obtained in this manner have a high component of $\beta V$ crystals and therefore offer advantages over mechanically produced seed crystals in the production of chocolate. The process can be carried out with high space-time yields and therefore offers economical advantages over traditional processes. Furthermore, the use of the produced seed crystals for producing chocolate products with advantageous organoleptic qualities is subject matter of the invention.

15 Claims, 7 Drawing Sheets

Key: Schokoladenpulver = chocolate powder
Kakaobutterpulver = cocoa butter powder
Temperatur = temperature Key: Schokolade = chocolate
Zeit = time Key: Kakaobutter = cocoa butter
Zeit = time Key: Schokolade = chocolate Kakaobutter = cocoa butter Temperatur = temperature

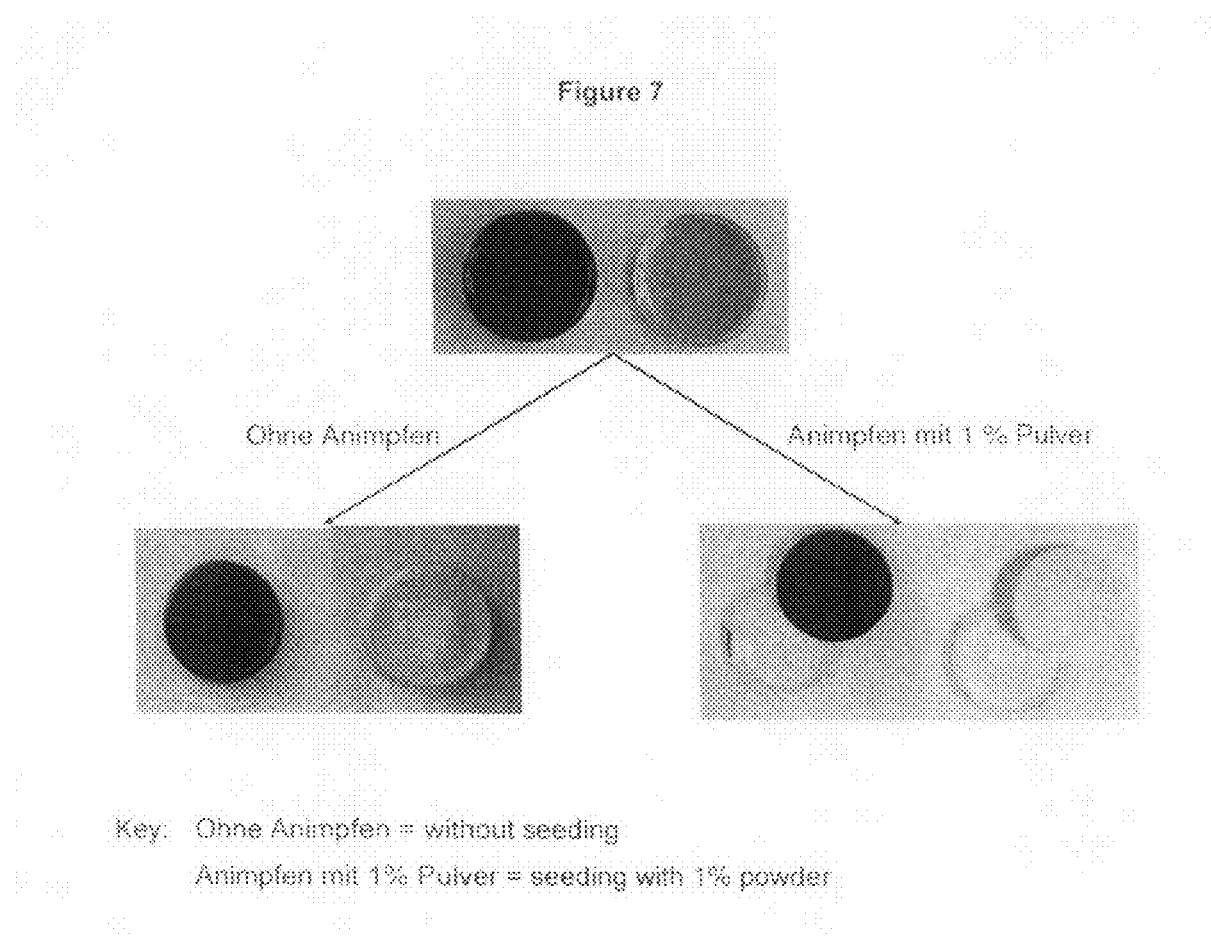

PROCESS FOR PRODUCING STORAGE-STABLE SEED CRYSTALS OF COCOA BUTTER AND/OR OF CHOCOLATE MASSES

BACKGROUND OF THE INVENTION

This application claims priority from European patent application EP 09 013 408.1, filed Oct. 23, 2009, and the entire contents of European patent application EP 09 013 408.1 are incorporated herein by reference.

The subject matter of the invention is a process for producing seed crystals for chocolate products, which process comprises the steps of heating cocoa butter or chocolate masses, mixing the heated mass with a supercritical fluid and expanding the solution obtained in an expansion apparatus so that the formation of powder particles takes place and separation of the powder particles from the gas, as well as the use of the seed crystals obtained for the production of chocolate products.

The production of chocolate is a time-intensive process in spite of modern engineering. The most important quality features of chocolate, such as melting properties, breaking quality, consistency and appearance are a function of the crystal structure of the triglycerides of the cocoa butter contained in the chocolate. The chocolate mass is therefore traditionally subcooled in order to form crystals and subsequently melted again in order to obtained the most ideal crystal structures possible. During this "tempering" the liquid chocolate mass is subjected to a controlled series of different temperatures, i.e., to an alternating cooling down and a reheating. The goal here is to obtain as many crystals as possible in the $\beta V$ form. Cocoa butter crystallizes in 6 different crystal forms that have different melting points between 17.3° C. and 36.3° C. The crystal structures are in the series of rising melting points (according to G. Baler, Lebensmittel-Industrie (that is, "Food Industry", here and elsewhere) No. 314, 2005, p. 6):

| | |
|---|---|
| γ | 0° C. to 18° C. |
| α | 18° C. to 22.5° C. |
| βIII | 22.5° C. to 27.5° C. |
| βIV | 27.5° C. to 29.5° C. |
| βV | 29.5° C. to 33.5° C. |
| βVI | 33.5° C. to 37° C. |

The crystal forms γ, α, βIII and βIV are semi-stable or not stable, for which reason they are undesired in the production of chocolate. Only the crystal forms βV and βVI, that are also designated in some cases as the β form and the $\beta_2$ form, have the desired stability. The βVI crystal structure does result in a rapid crystallization and solidification; however, since it feels waxy in the mouth it is undesired. On the other hand, a high proportion of βV crystals (beta five crystals) results in a pleasant melt with a stable crystal form. A high number of βV crystals can be produced by the above-described tempering of the liquid chocolate mass. As a result, the chocolate receives better quality properties regarding appearance, consistency and shelf life. In particular in the case of pralines and filled chocolate products this also prevents a premature migration of fat. The migration of fat can be observed as "fat bloom". Fat bloom is observed as a whitish coating on the chocolate. Fat bloom is produced by the formation of βVI crystals on the surface.

In order to accelerate the traditional tempering process, in some cases seed crystals are added to the mass during the production of chocolates, preferably before the tempering process. For example, cocoa butter crystals or chocolate crystals are used as seed crystals.

In a few processes a tempering can be eliminated as a function of the dosage of the seed crystals. After the forming, cooling and packaging the products treated in this manner display the properties of a well-tempered chocolate mass. However, it turned out that in as far as the seed crystals are produced by grinding or other mechanical comminuting processes the powdery particles do not have the desired morphology since the surfaces are frequently not intact and as a result even undesired crystal forms are present. There are therefore various attempts to produce seed crystals for the production of chocolate with the aid of non-mechanical processes.

Such a process for the production of seed crystals is described in DE 603 13 210 T2. In it a certain amount of a substance to be treated is dissolved in a supercritical fluid and expanded in a second zone, during which the particles to be crystallized precipitate during the expansion in the first dissolving zone as well as also in the collection zone. However, this process has the disadvantages that only a small amount of the cocoa butter or chocolate mass used is converted into RV crystals. In addition, depending on the way the process is conducted, a solvent is used as cosolvent that must be separated out again. In addition, the described process is a batch process that therefore has a poorer space-time yield than continuous processes.

Another process that is known for the production of powdery particles from fatty masses is the process described in EP 0744992 B1, "Particles from Gas-Saturated Solutions" (process PGSS) in which a certain amount of supercritical fluid is dissolved in a melted mass. The mass with the supercritical fluid dissolved in it is then expanded, during which the mass cools down by the expansion below the melting point of the substance to be treated and a powdery substance is obtained. However, the use of the PGSS process for treating cocoa butter results primarily in the undesired βVI form, as results from "High Pressure Process Technology: Fundamentals and Applications", section 9.8.7.2 "Cocoa butter", page 603 to 604, Industrial Chemistry Library, volume 9 (2001).

Another process known for the production of seed crystals is the apparatus of the "Seedmaster" as it is described by Böhler in "Lebensmittel-Industrie" No. 3 to 4, 2005, pages 6 to 7. In this process an additional apparatus is integrated into the system for the production of chocolate in which apparatus cocoa butter crystals are produced on site as seed crystals. These crystals are then fed directly from the apparatus into the system for the production of chocolate. As a result, a continuous process for the production of seed crystals can be made available. The disadvantage of this process is the fact that additional apparatuses must be installed in the system for the production of chocolate and the spatial separation of the production of seed crystals and the production of chocolate is not possible since the seed crystals obtained do not have sufficient stability for this. Furthermore, the maximally achievable solid content in the form of cocoa butter crystals is limited in this process and is approximately 12% m/m, so that the predominant component is liquid cocoa butter, which results in problems conditioned by the recipe.

WO 98/30108 A2 relates to a process for processing chocolate and chocolate products that comprises the use of crystallization nucleators in order to make stabile fatty crystals available in a chocolate without injecting the crystallization of the liquid fatty phase. The addition of the seed crystals takes place above the solidification temperature, as a result of which the crystallization of the fatty phase is shifted to the final cooling off, which has a significant influence on the processing possibilities. Chocolate can be obtained in this manner that has significantly lower fat contents than is usual. The extent of the crystallization in the fatty phase is reduced, during which the crystallization nucleators do not melt. Therefore, the processing range of the chocolate is selected between the chocolate solidification temperature and between the melting temperature of the crystallization nucleators. Preferably, crystals in the βV and βVI forms are present in the hardened chocolate product in the fatty phase. The production of seed crystals is not described.

The article by Braun et al., "Selective precrystallization: a revolutionary process", ZSW—Zucker—Süsswaren Wirtschaft: Fachzeitschrift für alle Bereiche der Süsswaren-Industry (that is, "Professional Journal for All Areas of the Confectionary Industry"), Beckmann Verlag GmbH & Co. KG, Jan. 1, 2002 describes a precrystallization process in which chocolate mass is precrystallized by being seeded with a crystal suspension of cocoa butter. In the process cocoa butter is melted in a tank at approximately 40 to 50° C. and subsequently shear-crystallized at a cooling-water temperature of 5 to 15° C. The sheer-crystallized cocoa butter is supplied to retained cocoa butter. The mixing takes place at a cooling-water temperature of 24 to 28° C., during which the mixture is held at this temperature for approximately 100 minutes. Primarily crystals in the βVI modification are obtained as seed crystals.

Also, US 2005/049426 A1 describes a process and an apparatus for the production of seed crystal suspensions based on a fatty melt, which process serves in particular to produce microdispersed crystal suspensions of cocoa butter with high βV—modification component. The seed crystallization of fat-based suspensions containing dispersed solid particles such as chocolate masses and chocolate-like masses or the like is described as a use for the crystal suspensions of cocoa butter, whereby the melt is seeded with the crystal nuclei suspensions.

DE 197 48 069 A1 relates to a process for the cooling down and atomizing of liquid or pastry substances or substance mixtures in which a liquid or pastry substance or such a substance mixture is combined with liquid or supercritical carbon dioxide and the mixture of liquid or pasty substance/ substance mixture and liquid or supercritical carbon dioxide is subsequently expanded.

US 2005/082701 A1 describes a process and an apparatus for particle formation in which a supercritical fluid is used in the process. In a first step the material from which fine particles are to be formed and the supercritical fluid are mixed with one another in a first chamber. The mixture is melted. In a second step the melt is transferred into a second chamber, more supercritical fluid is added before the mixture of the low-viscosity melt is expanded into an expansion chamber, which expansion chamber has a pressure below the critical pressure of the supercritical fluid in order to convert the supercritical fluid into a gas and to separate the material in particle form. Biologically active materials such as peptides and insecticides and biologically degradable polymers, e.g., polycaprolactone, are cited as material from which particles are to be formed. This process and the previously cited processes do not supply any or only low amounts of βVI crystals in the production of seed crystals from cocoa butter.

WO 2009/005346 A1 describes a method for the production of particles in the food area from a lipid and a water-soluble active substance that comprises the dispersing or emulsifying of the active substance in the lipid, the following mixing with a supercritical or gaseous medium and the spraying of the mixture. Reaction conditions under which an especially advantageous crystallization form is obtained are not named.

EP 0 521 205 A1 describes a process for using seed crystals for the production of tempered confections. The process provides that a continuous addition of crystal nuclei to the liquid confection composition takes place in the form of a suspension. Continuously operating systems are associated as a rule with greater investment costs than discontinuous systems. The process according to EP 0 521 205 A1 requires that the apparatus for the continuous addition of the crystal nuclei is directly coupled to the system for the production of chocolate; thus, additional apparatuses are also required here in the system for the production of chocolate.

SUMMARY OF THE INVENTION

The present invention therefore addresses the problem of making a process for the production of seed crystals available that are present as storage-stable particles in powdery form and have a high component of βV crystals. This powder should be able to be distributed finely and readily in the chocolate melt. The process should have high space-time yields and not require additional solvents or chemicals. In addition, the process should be able to be carried out economically and in an environmentally friendly manner. The process in accordance with the invention should also be able to be carried out spatially independently of the chocolate production process since the seed crystals produced are correspondingly storage-stable. The seed crystals produced should result in chocolates with a good glaze, appearance and good organoleptic qualities.

The problem is solved in accordance with the invention by a process for the production of seed crystals for chocolate products, which process comprises the following steps:
  A. Heating cocoa butter until a liquid is produced or heating chocolate masses until a suspension or liquid is produced,
  B. Mixing the melted mass with a supercritical fluid under pressure,
  C. Expanding the obtained solution in an expansion apparatus so that the formation of powder particles of cocoa butter or chocolate takes place, and
  D. Separation of the powder particles from the gas, characterized in that
  E. The cocoa butter particles or chocolate powder particles obtained according to step D are stored for a time period of at least 2 days at a temperature 15° C. to 25° C., and the process according to steps A to D is carried out continuously and
    the mixing ratio of melted mass to supercritical fluid is 1:1 to 2:1: relative to the mass of the fluid and of the melted substance and
    the obtained cocoa butter powder or chocolate powder contains a very high amount of βV crystals, for example, above 95% m/m relative to the crystalline amount.

BRIEF DESCRIPTION OF THE FIGURES

FIG. 7 shows seeded and non-seeded chocolate and cocoa butter before and after hardening.

DETAILED DESCRIPTION OF THE INVENTION

Figure 1:
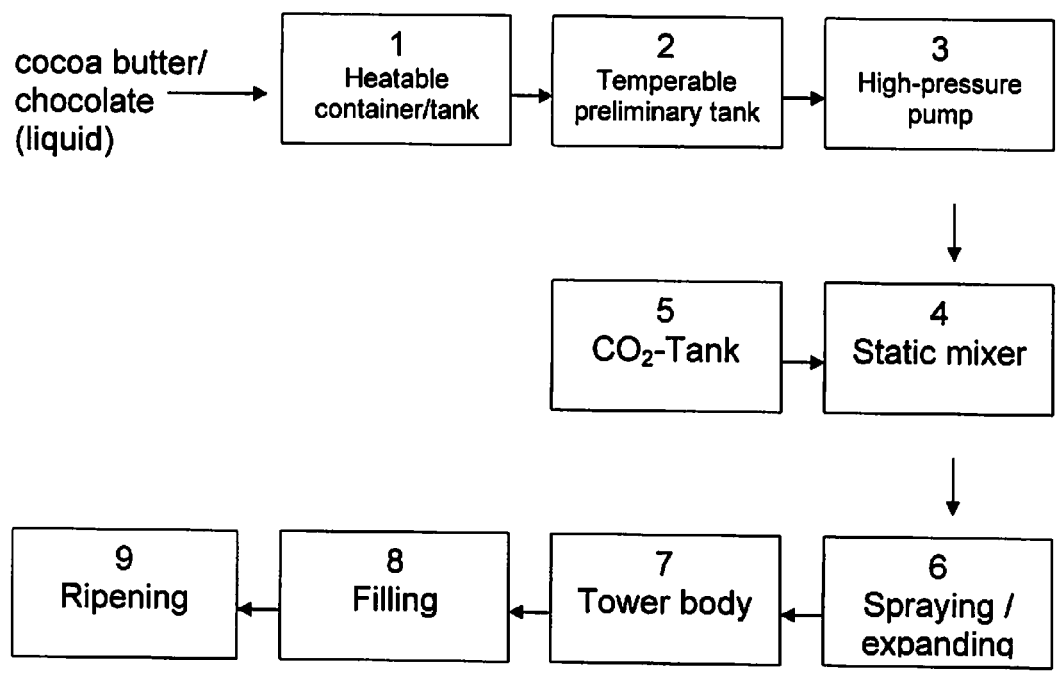
FIG. 1 is a flowchart of the process for producing the seed crystals.

Further embodiments are subject matter of the subclaims or are described in the following.

"Cocoa butter" in the sense of the invention denotes the fat of the cocoa bean.

"Chocolate mass" denotes masses that comprise cocoa butter, sugar, other fatty substances or non-fatty substances of vegetable or animal origin. "Melted mass" denotes in the sense of the invention the cocoa butter heated according to process step A, that is present as liquid, and denotes the heated chocolate mass that is present as suspension or liquid. Thus, the melted mass can be a liquid or a suspension of solid particles in a liquid, e.g., in liquid fat.

"Supercritical fluid" in the sense of the invention denotes compressible gases in the supercritical state. "Supercritical" denotes in this context that these gases are above the critical temperature so that liquid and gas can no longer be distinguished, for which reason supercritical fluid is used.

"Seed crystals" in the sense of the invention denotes fine, powdery particles with a high crystalline component. The seed crystals of the invention are based on cocoa butter or chocolate mass.

After the heating of the cocoa butter or the heating of the chocolate mass the melted mass is mixed in step B, preferably with static mixing elements, with the supercritical fluid, preferably in a mixer, It is also possible to mix the supercritical fluid and the heated cocoa butter or the heated chocolate mass with other traditional mixers, for example, an agitating element.

In the process in accordance with the invention the supercritical fluid is mixed under a pressure that is slightly above or below the critical pressure of the fluid with the melted mass. The mixing ratio of cocoa butter or of chocolate to supercritical fluid here is 1:1 to 2:1, i.e., only as much fluid is dissolved in the melted cocoa butter or in the melted chocolate so that a maximum of an equal mass ratio of melted cocoa butter or chocolate to supercritical fluid is present. This ratio influences the particle morphology and the crystal form in the final substrate. Other than in traditional processes in which a slight amount of melted substance is dissolved in a large amount of supercritical fluid, in the present process the gas is dissolved in the melted substance and not vice versa.

After the mixing of the liquid cocoa butter or of the liquid or suspended chocolate mass with the supercritical or slightly subcritical fluid the mixture is expanded. As a result of the expansion the fluid is put back into the gaseous state, during which it cools down. During the cooling down the melting point of the cocoa butter or of the chocolate mass is dropped below so that the latter precipitates in the form of powder particles. According to the invention a spray tower is used as expansion apparatus for the expansion of the obtained solution of fluid and melted mass. The spray tower preferably has an expansion nozzle with a diameter of 1.0 to 2.0 mm at a volume of 1 to 3 $m^3$.

The powder particles are packaged and ripened under defined temperature conditions. During this ripening stable fat crystals form primarily in the $\beta V$ form that then can be made available, like other pulverized substances, to the producers of chocolate.

Carbon dioxide or short-chain alkanes with 1 to 4 carbon atoms such as, for example, methane, ethane, propane, n-butane or iso-butane are preferably used as supercritical fluids. Carbon dioxide is especially preferably used as supercritical fluid, preferably at pressures between 5000 kPa to 20,000 kPa, especially preferably 11,000 kPa.

The process in accordance with the invention results in storage-stable seed crystals for chocolate products that contain a high amount of RV crystals. The powdery particles of the seed crystals preferably have a size between 1 μm and 50 μm, especially preferably 10 μm to 50 μm. Finer powders can be emulsified better into the chocolate melt and yield a greater number of nuclei of crystallization as crystallization starters at the same weighed portion. It turned out that it is essential for the invention to store the powder particles obtained from cocoa butter or chocolate mass for at least 2 days at a temperature of 15 to 25° C. following the production. Storage conditions of 17 to 20° C. and storage time of 2 to 20 days are especially advantageous. It is especially preferable to make a storage at 17 to 20° C. for 14 days. The storage (step E) brings about a further ripening of the powder particles, during which the product crystallizes out without residue and the final crystal formation takes place during the ripening. The storage can take place spatially independently of the continuous production of the powdery seed crystals.

At the beginning of the process in accordance with the invention at first cocoa butter or chocolate mass is heated as initial substance (step A). The heating takes place, for example, in a dissolving tank, during which a liquid is produced from the cocoa butter and a liquid or suspension of solid particles in a liquid from the chocolate mass as a function of the temperature selected, during which, for example, only the fat component in the chocolate mass dissolves. The heating in the dissolving tank preferably takes place at a temperature of above 40° C. Likewise, the mixing of the cocoa butter liquid or chocolate liquid or suspension takes place at temperatures above 40° C.

The process in accordance with the invention has the advantage that it allows the production of seed crystals without the addition of chemicals or solvents. The seed crystals obtained are accordingly free of contaminants by foreign substances. In addition, the expansion described in the process achieves a microbiological sterilization effect that also positively influences the stability of the seed crystals produced in accordance with the invention. Higher space-time yields are achieved by producing the powders in a continuous process in comparison to previous batch processes, so that the process permits a more economical production of the seed crystals. The production of the seed crystals takes place here spatially independently of the chocolate production so that no additional apparatuses have to be installed for the chocolate production. The seed crystals produced in accordance with the invention can be charged into the chocolate masses without a very great expense for machines on account of their particle size and particle morphology.

Further subject matter of the invention is the use of the seed crystals produced in accordance with the invention in amounts of at least 0.1%, preferably up to approximately 1 wt. % relative to the chocolate mass for the production of chocolate. The seed crystals can be used in liquid chocolate masses, customarily at temperatures of approximately 28° C. to 33° C., in particular when low viscosities are technically necessary for forming, e.g., the production of hollow body figures or pralines the work can be carried out at higher temperatures without having to renounce advantages of tempered chocolate.

The chocolate masses obtained using the seed crystals produced in accordance with the invention have splendid organoleptic qualities, a good melt, shelf life, low or no formation of fat bloom, good breaking quality and good consistency quality. The advantageous qualities can also be seen in the use for the production of pralines, in particular in the "one-shot process" customary for praline production.

In addition, it could also be observed that the tempering times of the chocolate can be distinctly shortened by using the seed crystals in accordance with the invention. Thus, crystallization times of 22 to 90 minutes according to the previous state of the art were shortened to 2 to 35 minutes when using the cocoa butter powder of the invention. This results in distinct savings of energy and of processing costs. In addition, other than is the case in known processes, it is not necessary to install additional apparatuses. In addition, the chocolate masses obtained in this manner display a better separation behavior, which again has advantages during the production.

Another advantage is the fact that the seed crystals can be produced from the same chocolate mass as the final product. Thus, no changing of the recipe is necessary since the composition and the component of cocoa butter does not change during the addition of the seed crystals from the same chocolate mass. Even the organoleptic qualities are not changed by the addition of the seed crystals of chocolate. Otherwise, in traditional processes in which she crystals of cocoa butter are added in distinctly greater amounts than 1 wt. %, a change of the recipe always occurs as which can negatively influence the production of chocolate and/or require a changing or an adaptation of the recipe.

In the process of the invention the entire mixture sprayed via the expansion nozzle is converted into powdery crystals or powdery particles with a polymorphous crystalline form and a high specific surface.

Seed crystals with a high βV component are surprisingly obtained with the process in accordance with the invention. Other than is described in the literature, the process in accordance with the invention has the result that not only βVI crystals are produced, as is described in the literature for the traditional PGSS process. ("High Pressure Process Technology: Fundamentals and Applications", Section 9.8.7.2 "Cocoa butter", pages 603 to 604, Industrial Chemistry Library, Volume 9 (2001)).

The process in accordance with the invention is explained in detail by way of the invention using the flowchart of the process for producing the seed crystals as shown in FIG. 1.

FIG. 1 shows the schematic course of the production of the seed crystals in accordance with the invention. Liquid cocoa butter or liquid chocolate is conducted from a heatable tank 1 into a preliminary tank 2 that can be tempered. Cocoa butter is heated to approximately 40° C. in preliminary tank 2. The heated cocoa butter is conducted via a pipeline with a pump 3 to a mixer 4 with static mixing elements. In another receiving container 5 carbon dioxide is stored in a liquid state. The liquid carbon dioxide is also conducted via a pipeline to mixer 4. The mixer is tempered at a temperature of 40° C. After the mixing in mixer 4 the cocoa butter melt/chocolate melt mingled with fluid is expanded via the expansion nozzle into spray tower 6. The powder obtained is collected at the foot of spray tower 7 or gas/powder separator (cyclone). The powder is filled directly into container 8. The filled-in product is then further ripened in a storage space 9 for 14 days at 15° to 25° C.

The invention is explained further using the following examples without being limited to them.

Example 1

The following table shows the test conditions for the examples 3 to 10. Tests 3 to 7 are reference tests whereas examples 8 and 10 are in accordance with the invention.

TABLE 1

| Examples results of tests 1-7 | | | |
|---|---|---|---|
| | Test No..: | | |
| | 3 | 4 | 5 |
| Pressure in front of the nozzle (bar) | 140 | 110 | 95 |
| nozzle (mm) | 1 | 1.3 | 1.3 |
| Flowthrough product (kg/h) | 155 | 165 | 120 |
| $CO_2$ amount (Kg/h) | 95 | 95 | 95 |
| Temperature tower chamber product (° C.) | 10.5 | 11.2 | 7.5 |
| storage (° C.) | 6 | 6 | 6 |
| Storage time/storage conditions | 14 days/ cooling house | 14 days/ cooling house | 14 days/ cooling house |
| DSC-measuring peak (s) max. | 20.6/27.8 | 20.4/28.2 | 20.8/27.2 |
| DSC-measuring | no beta 5 | No beta 5 | No beta 5 |

| | Test No..: | | | |
|---|---|---|---|---|
| | 7 | 8 | 9 | 10 |
| Pressure in front of the nozzle (bar) | 115 | 140 | 110 | 95 |
| nozzle (mm) | 1 | 1 | 1.3 | 1.3 |
| Flowthrough product (kg/h) | 105 | 155 | 165 | 120 |
| $CO_2$ amount (Kg/h) | 95 | 95 | 95 | 95 |
| Temperature tower chamber product (° C.) | 7.5 | 10.5 | 11.2 | 7.5 |
| storage (° C.) | 17-18 | 17-18 | 17-18 | 17-18 |
| Storage time/ storage conditions | 14 days/ 17 to 18° C. air-conditioned hall | 14 days/ 17 to 18° C. air-conditioned hall | 14 days/ 17 to 18° C. air-conditioned hall | 14 days/ 17 to 18° C. air-conditioned hall |
| DSC-measuring peak (s) max. | 20.4/28.67 | 33.2 | 32.9 | 32.67 |
| DSC-measuring | No beta 5 | Beta 5 | Beta 5 | Beta 5 |

It turns out that measurable portions of βV crystals are formed by the storage at temperatures of 17 to 18° C. for 14 days whereas no βV crystals are formed under other storage conditions from cocoa butter powders produced under identical conditions (reference examples 4, 5, 3). In addition, it can be recognized from the comparison of test 7 to test 8 that a distinctly greater amount of substance must be used than the fluid carbon dioxide in order that βV crystals form.

Figure 2:
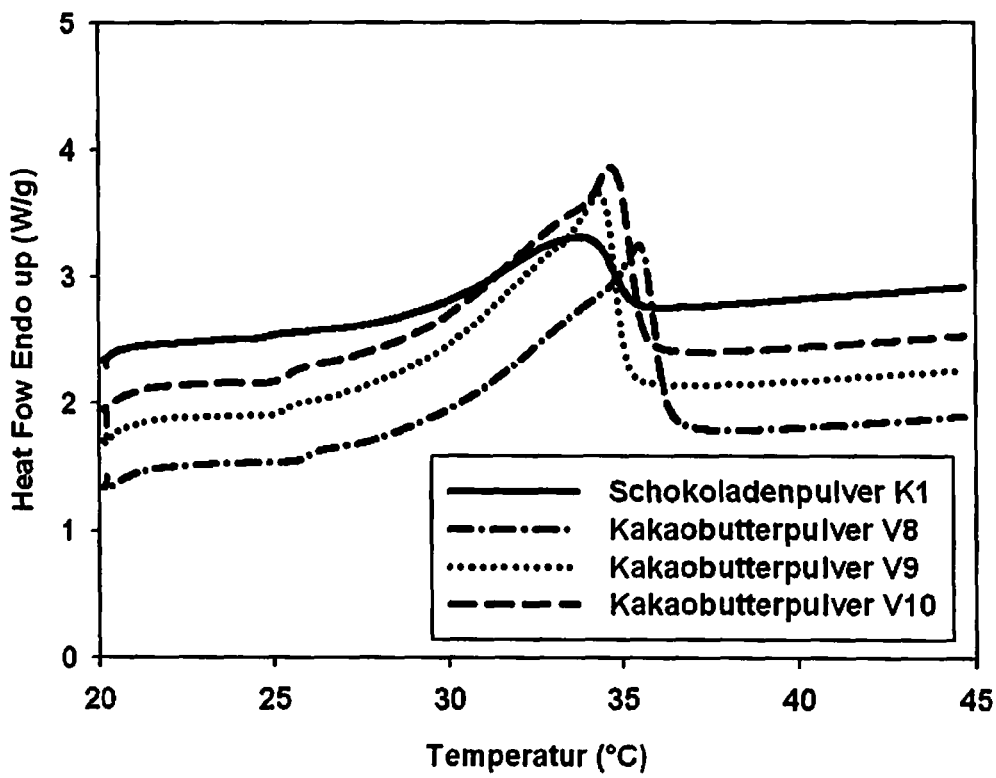
FIG. 2 shows DSC melting curves of the chocolate powder and of the cocoa butter powder.

FIG. 2 shows typical melting curves for cocoa butter power and chocolate powder produced in accordance with the invention. The melting peak with a maximum at ca. 33.5° C. allows only crystal form βV to be recognized. Therefore, the powders are themselves at a relative 100% relative to the crystalline component in the stable state and suitable as seed crystallizate. As was expected, the peak surfaces (melting enthalpies) of the chocolate powders are smaller than the pure cocoa butter and they correspond to the fat contents.

Crystallization Kinetics in DSC

West African cocoa butter was melted at 60° C. and then cooled down to 30° C. In this subcooled state the melt can be preserved for a few hours. Parts were branched off and compounded at 30° C. with 2% or 0.1% cocoa butter powder produced in accordance with the invention. Non-seeded cocoa butter melt served as reference.

Figure 3:
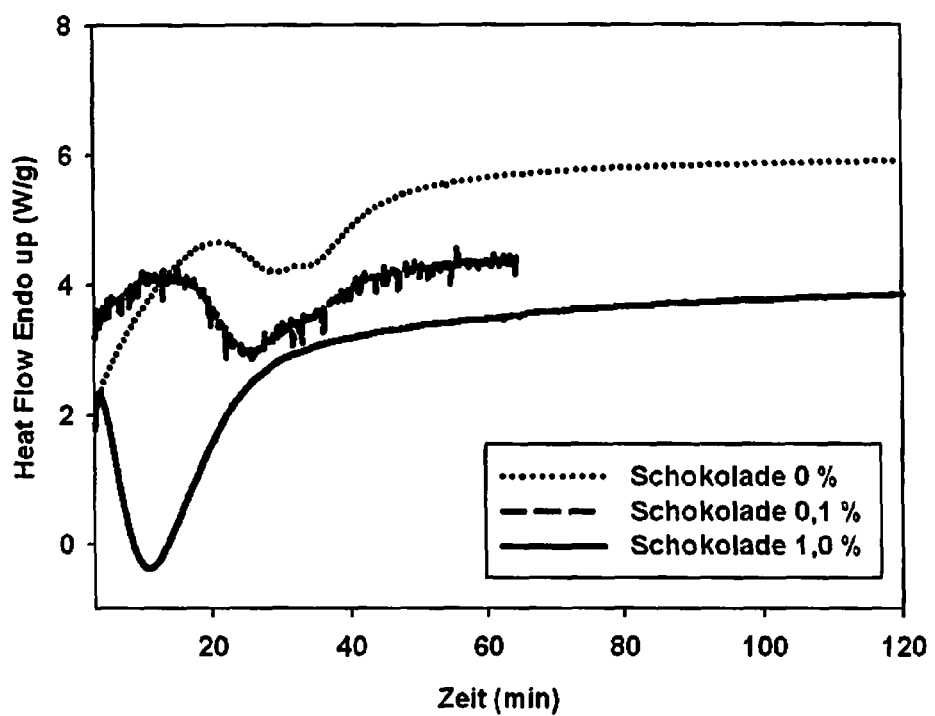
FIG. 3 shows DSC crystallization curves of chocolate seeded with chocolate powder and non-seeded chocolate.
Figure 4:
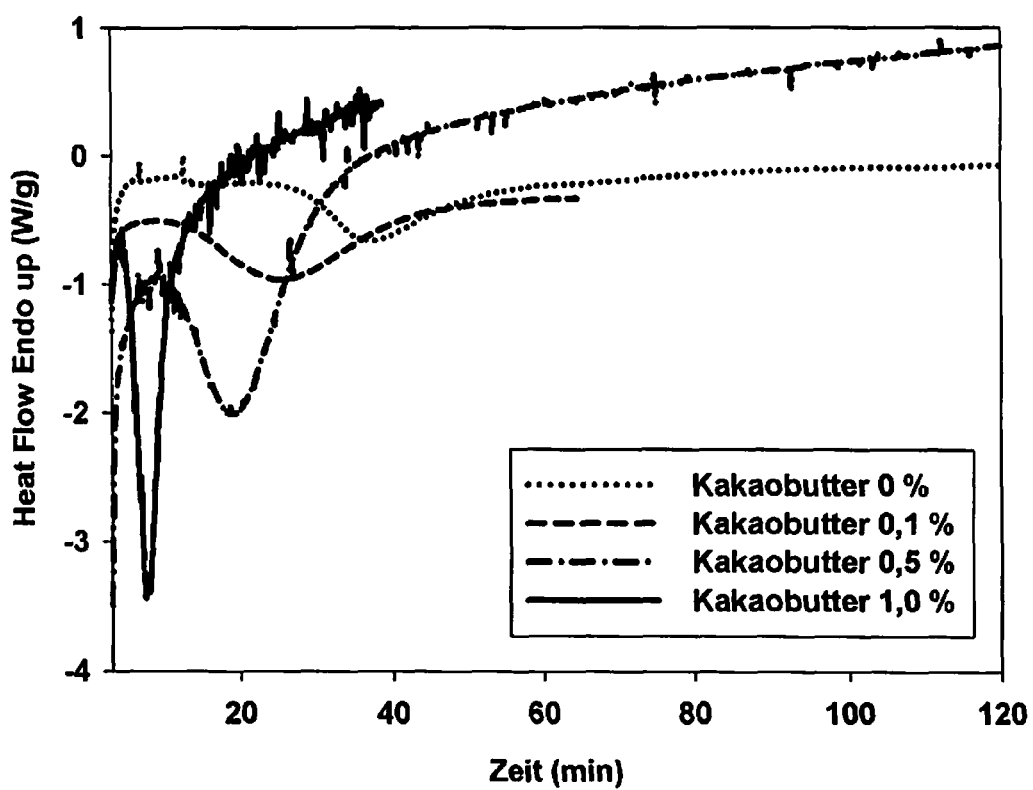
FIG. 4 shows DSC crystallization curves of cocoa butter seeded with cocoa butter and non-seeded cocoa butter.

The samples were weighed individually at 27° C. into a small DSC pan and rapidly cooled down in DSC to 20.5° C. in the case of chocolate powder and 19° C. in the case of cocoa butter powder and held there isothermally. At 20.5° C. respectively 19° C. the crystallization course in DSC was determined using the developed crystallization heat. Tables 2 and 3 show the data obtained. The corresponding DSC crystallization curves are collated in FIG. 3 and FIG. 4.

TABLE 2

Crystallization times of chocolates seeded with chocolate powder produced in accordance with the invention and of non-seeded chocolates

| Concentration chocolate powder in chocolate | Start of crystallization (Onset) | Maximum of crystallization | End of crystallization |
|---|---|---|---|
| 0% | ca. 22 min | ca. 33 min | ca. 90 min |
| 0.1% | ca. 11 min | ca. 25 min | ca. 50 min |
| 1.0% | ca. 2 min | ca. 11 min | ca. 35 min |

TABLE 3

Crystallization times of cocoa butter seeded with cocoa butter powder produced in accordance with the invention and of non-seeded cocoa butter

| Concentration cocoa butter powder in cocoa butter | Start of crystallization (Onset) | Maximum of crystallization | End of crystallization |
|---|---|---|---|
| 0% | ca. 26 min | ca. 37 min | ca. 70 min |
| 0.1% | ca. 13 min | ca. 26 min | ca. 60 min |
| 0.5% | ca. 11 min | ca. 19 min | ca. 50 min |
| 1.0% | ca. 5 min | ca. 8 min | ca. 30 min |

The powder produced in accordance with the invention results in an acceleration of the crystallization.

Dispersion Behavior and Product Quality

Figure 5:
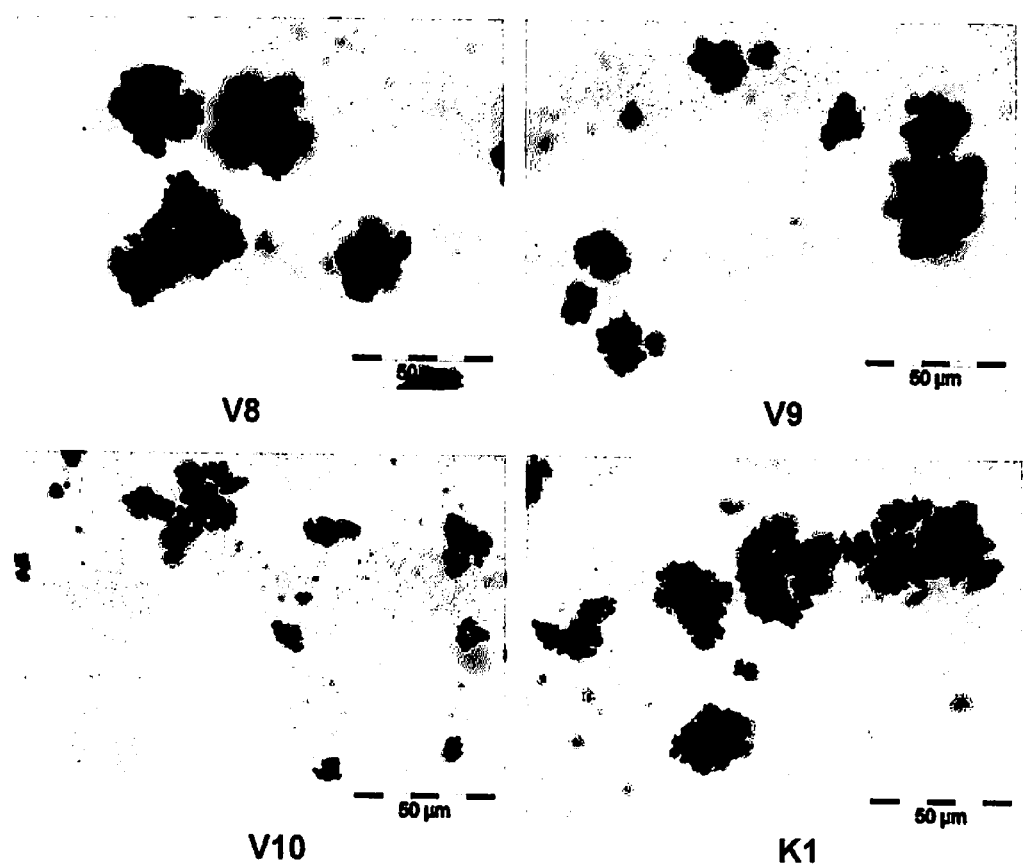
FIG. 5 shows microscopic photographs of cocoa butter powder and of chocolate powder that were produced in accordance with the invention.

FIG. 5 shows microscopic photographs of cocoa butter powder and of chocolate powder that were produced in accordance with the invention. V10 and the chocolate powder K1 show the finest powders in a microscopic image. The finer the powder the better it can be dispersed in the chocolate melt. Furthermore, finer powders yield a greater number of crystallization nuclei than crystallization starters at the same weighed portion. This should raise the rate of cocoa butter crystallization.

0.1 to 1% relative to the total mass of cocoa butter powder or chocolate powder produced in accordance with the invention was stirred into a subcooled cocoa butter melt at 30° C. The powder was able to be finely dispersed without problems or clumping, so that stable dispersions were produced. The powder does not melt here into the cocoa butter melt.

The seed crystals produced in accordance with the invention are to be processed appropriately well during the production of chocolate.

Example 3

A non-seeded cocoa butter melt and a cocoa butter melt seeded with 2% were placed into small Petri dishes and cooled to 20° C. The seeded sample crystallized and solidified immediately to a dense shiny disk. This disk can be readily separated out of the Petri dish since the crystal form βV produced has a high density and is contracted in volume relative to the melt. The non-seeded melt forms a soft fat at 20° C. that can not be separated out of the form, as can be recognized from FIG. 7. This corresponds, as is known, to a mixed form consisting of αIII and βIV.

Example 4

Figure 6:
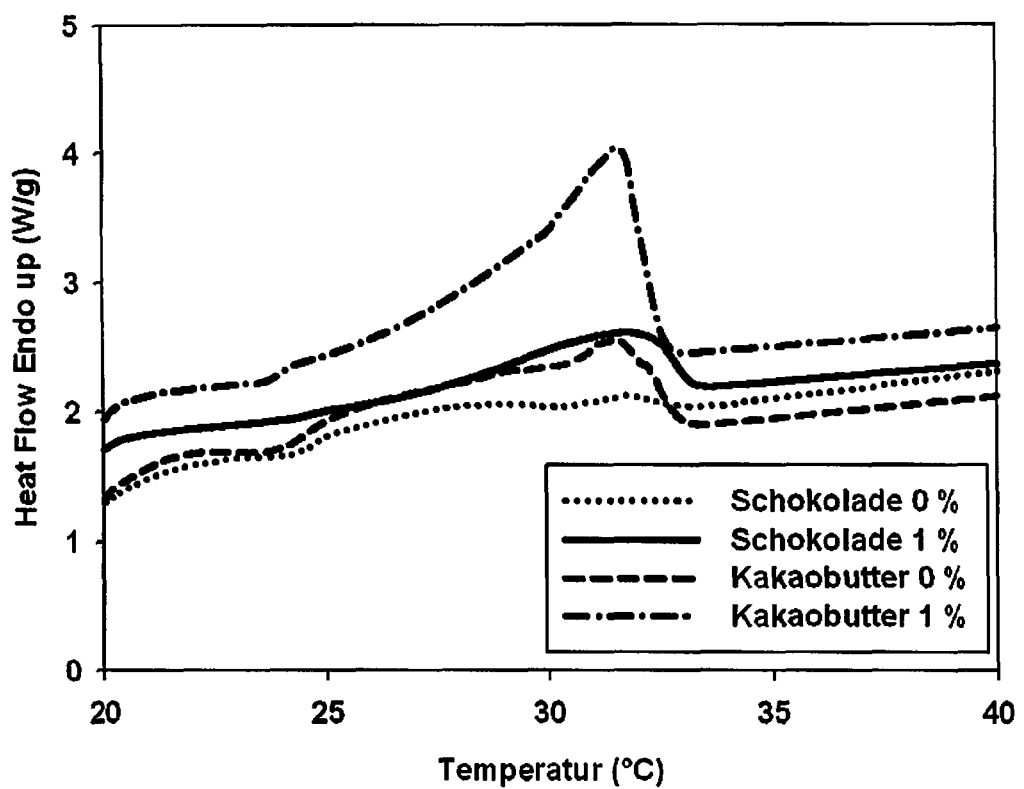
FIG. 6 shows DSC melting curves of seeded and non-seeded, hardened chocolate and cocoa butter.

Chocolate and cocoa butter were melted at 60° C. and subsequently cooled down to 30° C. They were then seeded with 0% or 1% of the particular powder and poured into plastic dishes and stored at 7° C. until hardening. Melting curves were determined from the hardened, formed products in DSC. They are shown in FIG. 6.

The DSC melting curves clearly show the effect of the seeding with chocolate powder or cocoa butter powder. As a result of the seeding the formed products crystallize to a high degree in the desired βV form. The non-seeded products crystallize in different crystal forms, including βIV, and to a low extent βV. Only the seeded products can be readily dumped out the form after hardening after ca. 30 min. This contraction of the hardened chocolate forms or cocoa butter forms is also an effect of a crystallization in βV form which is correct and desired in the production of chocolate.

The complete crystallization in βV structure was able to be demonstrated in the seeded products with DSC. In the non-seeded products the cocoa butter crystallizes in βV only in small amounts. The crystallization values are shown in table 4.

TABLE 4

Crystal components in the seeded and non-seeded chocolates and cocoa butter.

| | Relative component β'(IV) | Relative component β(V) | Total fat content |
|---|---|---|---|
| Seeded cocoa butter | — | 100% | 86%* |
| Non-seeded cocoa butter | 83% | 17% | 63%* |
| Seeded chocolate | — | 100% | 85%**) |
| Non-seeded chocolate | 93% | 7% | 70%**) |

*Calculated standard values for cocoa butter crystals (βIV: 119 J/g and βV: 137 J/g) according to Lit. Schenkel, Rufer. ZSW 1983.
**Relative to an estimated fat content of 32%

The chocolate powder and the cocoa butter powder bring about the expected acceleration of crystallization in the correct crystal modification βV.

The invention claimed is:

1. A process for the production of seed crystals for chocolate products, which process comprises the following steps:
    A. heating and melting cocoa butter until a liquid is produced, or heating and melting chocolate masses until a suspension or liquid is produced,
    B. mixing the suspension or liquid with a supercritical fluid under pressure, wherein the mixing ratio of suspension or liquid to supercritical fluid is 1:1 to 2:1 relative to the mass of the fluid and of the suspension or liquid substance, and C. expanding the obtained solution in an expansion apparatus so that the formation of powder particles of cocoa butter or chocolate is effected, and
D. separating the cocoa butter particles or chocolate powder particles from the gas,
E. storing the cocoa butter particles or chocolate powder particles for a time period of at least 2 days at a temperature between 15° C. to 25° C., wherein the cocoa butter powder or chocolate powder contains at least 50 wt. %βV crystals relative to the crystalline components,
wherein steps A to D are repeated.

2. The process according to claim 1, wherein the mixing takes place according to step B in a mixer.

3. The process according to claim 2, wherein the mixer has static mixing elements.

4. The process according to claim 1, wherein the expansion apparatus is a spray tower.

5. The process according to claim 1, wherein the expansion apparatus has an expansion nozzle with a diameter of 1.0 to 2.0 mm.

6. The process according to claim 1, wherein the supercritical fluid is selected from the group of carbon dioxide or short-chain alkanes with 1 to 4 carbon atoms.

7. The process according to claim 1, wherein the gas used is carbon dioxide.

8. The process according to claim 1, wherein the pressure is between 5000 kPa and 20,000 kPa.

9. The process according to claim 1, wherein the pressure is 11,000 kPa.

10. The process according to claim 1, wherein in the powder particles obtained have a size between 1 μm and 50 μm.

11. The process according to claim 10, wherein in the powder particles obtained have a size between 10 μm-50 μm.

12. The process according to claim 1, wherein the storage takes place according to process step E for a time period of at least 14 days.

13. The process according to claim 1, wherein in step A a dissolving tank is used for heating the cocoa butter or chocolate masses, which dissolving tank tempers the cocoa butter or chocolate masses to a temperature>40° C.

14. The process according to claim 1, which includes the further step of adding at least 0.1 wt. % of the powdery particles obtained to chocolate mass, under conditions that the chocolate mass crystallizes.

15. A process according to claim 1, wherein in Step A chocolate masses are used that contain as a fat component only cocoa butter, or chocolate masses are used in which cocoa butter is entirely or partially replaced by other vegetable fats.

* * * * *